US012738108B2

(12) United States Patent
Cho et al.

(10) Patent No.: US 12,738,108 B2
(45) Date of Patent: *Sep. 15, 2026

(54) METHOD AND APPARATUS FOR CONTROLLING VEHICLE

(71) Applicants: Hyundai Motor Company, Seoul (KR); Kia Corporation, Seoul (KR)

(72) Inventors: Jeong Min Cho, Seoul (KR); Jae Woong Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 16 days.

This patent is subject to a terminal disclaimer.

(21) Appl. No.: 18/945,289

(22) Filed: Nov. 12, 2024

(65) Prior Publication Data

US 2025/0174059 A1 May 29, 2025

(30) Foreign Application Priority Data

Nov. 23, 2023 (KR) ........................ 10-2023-0164225

(51) Int. Cl.
*G07C 5/08* (2006.01)
*B62D 15/02* (2006.01)

(52) U.S. Cl.
CPC ......... *G07C 5/0808* (2013.01); *B62D 15/021* (2013.01)

(58) Field of Classification Search
CPC .. G07C 5/0808; B62D 15/021; B62D 5/0484; B62D 15/0265; B62D 5/003;
(Continued)

(56) References Cited

U.S. PATENT DOCUMENTS 4,716,981 A * 1/1988 Murao .................. B62D 7/148 180/412
5,014,801 A * 5/1991 Hirose ................ B62D 7/1581 701/43
(Continued)

FOREIGN PATENT DOCUMENTS

CN 118225151 A * 6/2024 .......... G01M 17/007
CN 120096667 A * 6/2025 ........... B62D 5/0487
(Continued)

OTHER PUBLICATIONS

"Simple Understanding of Kinematic Bicycle Model" Ding, Yan Aug. 12, 2022 https://web.archive.org/web/20220812025531/https://dingyan89.medium.com/simple-understanding-of-kinematic-bicycle-model-81cac6420357 (Year: 2022).*
(Continued)

*Primary Examiner* — Angelina M Shudy
(74) *Attorney, Agent, or Firm* — MORGAN, LEWIS & BOCKIUS LLP

(57) ABSTRACT

In a method and apparatus for controlling a vehicle, the vehicle control apparatus includes rear-wheels steering unit configured to steer a rear wheel, to measure a rear wheel angle, and generate a status signal, a failure determination unit operatively connected to the rear-wheel steering unit and configured to determine a failure situation of the rear-wheel steering unit based on the status signal, a curvature prediction unit configured to generate a predicted curvature of a traveling route of a vehicle based on the failure situation, and a position prediction unit operatively connected to the curvature prediction unit and configured to generate a predicted position of the vehicle based on the predicted curvature, wherein the curvature prediction unit generates the predicted curvature based on the rear wheel angle.

11 Claims, 4 Drawing Sheets

(58) Field of Classification Search
CPC ... B62D 6/002; B62D 7/156; B60W 50/0097; B60W 30/08; B60W 30/18145; B60W 40/10; B60W 50/0205; B60Y 2400/84
See application file for complete search history.

(56) References Cited

U.S. PATENT DOCUMENTS 5,082,080 A * 1/1992 Kanazawa ............. B62D 7/159 701/43
5,099,938 A * 3/1992 Watanabe ............ B62D 7/1572 180/415
5,101,922 A * 4/1992 Ohmura ................. B62D 7/148 180/404
5,161,106 A * 11/1992 Shiraishi ................ B62D 7/148 701/43
5,197,008 A * 3/1993 Itoh ........................ B60K 28/16 180/197
5,212,642 A * 5/1993 Tanaka ................. B62D 7/1581 701/41
5,269,391 A * 12/1993 Ito .......................... B60K 28/16 180/197
5,276,624 A * 1/1994 Ito ........................... B60T 8/172 701/72
5,341,294 A * 8/1994 Kanazawa ........... B62D 7/1545 701/41
5,554,969 A * 9/1996 Eguchi ............... B62D 15/0225 180/404
5,816,669 A * 10/1998 Hiwatashi ............. B62D 7/159 303/146
5,950,758 A * 9/1999 Kim ....................... B62D 7/148 180/408
5,954,774 A * 9/1999 Jung ...................... B62D 7/159 701/41
6,024,187 A * 2/2000 Takeda ................... G01C 21/28 701/31.2
11,591,015 B2 * 2/2023 Eilers ................. B62D 15/0235
11,597,379 B2 * 3/2023 Yoon ........................ B62D 6/04
11,845,428 B2 * 12/2023 Kim ...................... B60W 10/18
12,522,290 B2 * 1/2026 Miano .................... B62D 7/159
2002/0007239 A1 * 1/2002 Matsumoto ........... B60W 30/02 701/41
2003/0080877 A1 * 5/2003 Takagi ................... H04N 7/181 348/E7.086
2004/0003956 A1 * 1/2004 Furumi .................. B62D 7/148 180/445
2005/0225477 A1 * 10/2005 Cong ................. B60K 31/0066 342/72
2008/0289897 A1 * 11/2008 Williams ............... B62D 5/003 180/402
2010/0250064 A1 * 9/2010 Ota ..................... B60W 40/076 348/148
2012/0053756 A1 * 3/2012 Han ...................... G01S 17/875 701/1
2013/0096778 A1 * 4/2013 Goto ...................... B62D 5/008 701/41
2013/0311045 A1 * 11/2013 Tanimoto ............. B62D 5/0481 701/42
2013/0317698 A1 * 11/2013 Yoon .................... B62D 15/025 701/41
2014/0121880 A1 * 5/2014 Dolgov ................. B60W 10/20 701/1
2015/0321655 A1 * 11/2015 Kim ........................ B60T 17/22 701/70
2015/0321696 A1 * 11/2015 Jang ....................... B62D 7/148 701/43
2016/0090100 A1 * 3/2016 Oyama ................ B62D 15/025 701/23
2017/0235307 A1 * 8/2017 Asakura ............... G05D 1/0061 701/23
2018/0043931 A1 * 2/2018 Gupta .................... B62D 6/005
2018/0297634 A1 * 10/2018 Kim ....................... B62D 7/159
2019/0002021 A1 * 1/2019 Yoo .......................... B62D 6/02
2019/0016338 A1 * 1/2019 Ishioka ........... B60W 30/18163
2019/0031202 A1 * 1/2019 Takeda ................ B60T 8/17557
2019/0299786 A1 * 10/2019 Nakagawa ................ B60L 3/00
2019/0367087 A1 * 12/2019 De Grammont ..... B62D 7/1509
2020/0001921 A1 * 1/2020 Balesteros-Tolosana .................... B60W 40/072
2020/0207301 A1 * 7/2020 Lombrozo .............. B60R 21/34
2020/0254996 A1 * 8/2020 Kashiwamura ....... B60W 30/10
2021/0240192 A1 * 8/2021 Zhang .................. G05D 1/0891
2022/0080953 A1 * 3/2022 Hwang ................. B60W 10/22
2022/0289288 A1 * 9/2022 Hultén ................. B62D 5/0463
2023/0018786 A1 * 1/2023 Kim ...................... B60W 10/18
2023/0071810 A1 * 3/2023 Lee ........................ G06N 3/006
2023/0101438 A1 * 3/2023 Kim .................... B60W 30/045 701/25
2023/0211824 A1 * 7/2023 Sakaguchi ......... B62D 15/0265 701/41
2024/0083426 A1 * 3/2024 Okamoto ................. G08G 1/09
2024/0140407 A1 * 5/2024 Park ...................... B60W 30/09
2024/0300578 A1 * 9/2024 Liu ........................ B62D 6/008
2024/0359697 A1 * 10/2024 Kim ....................... B62D 7/159
2024/0359735 A1 * 10/2024 Thelen ................... B62D 6/002
2025/0042465 A1 * 2/2025 Markström ............ B62D 5/005
2025/0042470 A1 * 2/2025 Miano .................... B62D 7/159
2025/0065892 A1 * 2/2025 Park .................. B60W 50/0225
2025/0174058 A1 * 5/2025 Cho ....................... B62D 7/159
2025/0376153 A1 * 12/2025 Cho ...................... B60W 30/02
2025/0382007 A1 * 12/2025 Kim ....................... B62D 7/159

FOREIGN PATENT DOCUMENTS

CN 120422868 A * 8/2025
JP H05301577 A * 11/1993
JP 2000238653 A * 9/2000
JP 3541867 B2 * 7/2004
JP 2004243850 A * 9/2004

OTHER PUBLICATIONS

CN-118225151-A machine translation (Year: 2024).*
CN-120096667-A machine traslation (Year: 2025).*
CN-120422868-A machine translation (Year: 2025).*
JP-2000238653-A machine translation (Year: 2000).*
JP-2004243850-A machine translation (Year: 2004).*
JP-3541867-B2 machine translation (Year: 2004).*
JPH05301577A machine translation (Year: 1993).*

* cited by examiner

METHOD AND APPARATUS FOR CONTROLLING VEHICLE

CROSS-REFERENCE TO RELATED APPLICATIONS

The present application claims priority to Korean Patent Application No. 10-2023-0164225, filed Nov. 23, 2023, the entire contents of which is incorporated herein for all purposes by this reference.

BACKGROUND OF THE PRESENT DISCLOSURE

Field of the Present Disclosure

The present disclosure relates to a method and apparatus for controlling a vehicle. More specifically, the present disclosure relates to an apparatus and method for controlling a vehicle with a rear-wheel steering system mounted thereon.

Description of Related Art

The statements in this section merely provide background information related to the present disclosure and do not necessarily form related art.

In a front wheel drive vehicle, a direction of the vehicle is changed by moving front wheels. A typical front wheel drive vehicle can only move front wheels, and rear wheels are fixed. That is, when a steering wheel is moved, angles of the front wheels with respect to a longitudinal axis of the vehicle change depending on change in an angle of the steering wheel, and the direction of the vehicle changes depending on the change in the angles of the front wheels.

However, a method of reducing a radius of curvature of a vehicle or controlling a slip angle of the vehicle by moving rear wheels of a front wheel drive vehicle together with front wheels when the vehicle turns has been developed. This method is called a rear wheel steering system. The rear wheel steering system controls the slip angle of the vehicle using in-phase control for moving the rear wheels in the same direction as the front wheels when the vehicle is traveling at high speed, improving traveling safety of the vehicle. On the other hand, when the vehicle is traveling at low speed, the rear wheel steering system reduces a radius of curvature of the vehicle using reverse phase control for moving the rear wheels in an opposite direction of the front wheels, increasing traveling convenience for a driver.

Among technologies applied to an autonomous vehicle, a collision avoidance technology predicts a position of the vehicle and determines a possibility of collision at the predicted position to control the vehicle. A vehicle including a rear wheel steering system mounted thereon is different from a typical front wheel drive vehicle, in a behavior upon turning due to a movement of rear wheels. Therefore, a vehicle position prediction method reflecting the movement of the rear wheels is needed.

Furthermore, a control method is needed so that a collision avoidance function operates even when the rear wheel steering system fails.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle control apparatus including a rear-wheel steering unit configured to steer a rear wheel, to measure rear wheel angles, and generate a status signal, a failure determination unit operatively connected to the rear-wheel steering unit and configured to determine a failure situation of the rear-wheel steering unit based on the status signal, a curvature prediction unit configured to generate a predicted curvature of a traveling routh of a vehicle based on the failure situation, and a position prediction unit operatively connected to the curvature prediction unit and configured to generate a predicted position of the vehicle based on the predicted curvature, wherein the curvature prediction unit generates the predicted curvature based on the rear wheel angle.

According to another exemplary embodiment of the present disclosure, the present disclosure provides a method performed by a vehicle control apparatus for generating a predicted position of a vehicle when the vehicle turns, the method including measuring a rear wheel angle, generating a status signal of a rear-wheel steering unit, determining a failure situation of the rear-wheel steering unit based on the status signal, generating a predicted curvature based on the failure situation, and generating at least one or more predicted positions of the vehicle based on the predicted curvature, wherein the generating of the predicted curvature includes generating the predicted curvature based on the rear wheel angle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
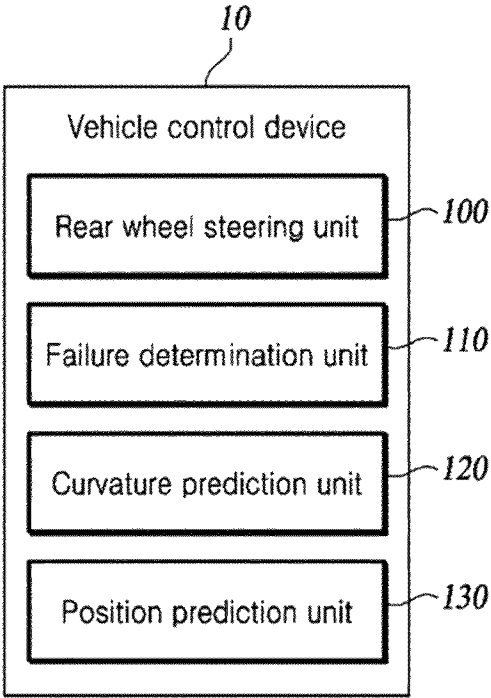
FIG. 1 is a schematic block schematic diagram of a vehicle control apparatus according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The present disclosure provides an apparatus and method for generating a predicted curvature and predicted positions of a vehicle based on a rear wheel angle when a vehicle turns.

Furthermore, according to an exemplary embodiment of the present disclosure, the present disclosure provides an apparatus and method for generating a predicted curvature and predicted positions of a vehicle based on whether or not a rear wheel angle is measurable.

The problems to be solved by the present disclosure are not limited to the problems mentioned above, and other problems not mentioned may be clearly understood by those skilled in the art from the description below.

Hereinafter, some exemplary embodiments of the present disclosure will be described in detail with reference to the accompanying drawings. In the following description, like reference numerals designate like elements, although the elements are shown in different drawings. Furthermore, in the following description of various exemplary embodiments of the present disclosure, a detailed description of known functions and configurations incorporated therein will be omitted for clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is directed to describe exemplary embodiments of the present disclosure, and is not intended to represent the only embodiments in which an exemplary embodiment of the present disclosure may be practiced.

FIG. 1 is a schematic block schematic diagram of a vehicle control apparatus according to an exemplary embodiment of the present disclosure.

Referring to FIG. 1, the vehicle control apparatus 10 includes all or some of a rear wheel steering unit 100, a failure determination unit 110, a curvature prediction unit 120, and a position prediction unit 130.

The vehicle control apparatus 10 receives at least one of a front wheel angle, a yaw rate, and a side slip angle. The front wheel angle refers to an angle formed between a longitudinal axis of the vehicle and the front wheel.

The front wheel angle, the yaw rate, and the side slip angle are received from sensors of the vehicle or determined by a processor mounted on the vehicle. Here, the sensors of the vehicle may include position sensors, speed sensors, pressure sensors, inertial sensors, temperature sensors and image sensors, etc.

The rear wheel steering unit 100 is configured to control rear wheels of the vehicle. The rear wheel steering unit 100 is configured to control the rear wheels based on a velocity and the front wheel angle of the vehicle. The rear wheel steering unit 100 is configured to control the rear wheels of the vehicle using, for example, an actuator. Here, the actuator may include pneumatic actuators, electric actuators and hydraulic actuators, etc. The rear wheel steering unit 100 can measure the rear wheel angle based on a stroke of the actuator.

The rear wheel steering unit 100 measures a length of the stroke using a stroke measurement sensor. According to an exemplary embodiment of the present disclosure, the rear wheel steering unit 100 can measure the rear wheel angle by converting the stroke length into a rear wheel angle according to a predetermined conversion table defining the relationship between the stroke length and the rear wheel angle. Here, the rear wheel angle refers to an angle formed between the longitudinal axis of the vehicle and the rear wheel.

The rear wheel steering unit 100 periodically generates a status signal and transmits the status signal to the failure determination unit 110. Here, the status signal includes whether or not rear wheel steering may be performed normally and whether or not the rear wheel angle is measurable. For example, the rear wheel steering unit 100 may transmit a status signal indicating whether the rear wheels are being normally controlled to the failure determination unit 110. As an exemplary embodiment of the present disclosure, the rear wheel steering unit 100 may transmit a status signal indicating that rear wheel steering does not operate normally, but the rear wheel angle is measurable. As an exemplary embodiment of the present disclosure, the rear wheel steering unit 100 may transmit a status signal indicating that the rear wheel steering does not operate normally and the rear wheel angle is not measurable, to the failure determination unit 110.

According to an exemplary embodiment of the present disclosure, when the actuator fails, the rear wheel steering unit 100 may transmit a status signal indicating that 'the rear wheels cannot be controlled, but the rear wheel angle is measurable.' According to another exemplary embodiment of the present disclosure, the rear wheel steering unit 100 may transmit a status signal indicating that 'the rear wheel angle is not measurable' when the stroke measurement sensor or a network fails.

The failure determination unit 110 is configured to determine a failure situation of the rear wheel steering unit 100. The failure determination unit 110 is configured to determine the failure situation of the rear wheel steering unit 100 based on the status signal transmitted by the rear wheel steering unit 100. Here, the failure situation includes whether or not rear wheel steering operates normally and whether or not the rear wheel angle is measurable.

The failure determination unit 110 is configured to control the curvature prediction unit 120 and the position prediction unit 130 based on the failure situation of the rear wheel steering unit 100. When the rear wheel steering unit 100 operates normally, the failure determination unit 110 is configured to control the curvature prediction unit 120 to generate a predicted curvature based on the rear wheel angle, the front wheel angle, or the like and to control the position prediction unit 130 to generate a predicted position of the vehicle based on the predicted curvature. When the rear wheel steering unit 100 does not operate normally but the rear wheel angle is measurable, the failure determination unit 110 is configured to control the curvature prediction unit 120 to generate a predicted curvature based on, for example, the measured rear wheel angle and front wheel angle and to control the position prediction unit 130 to generate a predicted position of the vehicle based on the predicted curvature. When the rear wheel steering unit 100 does not operate normally and the rear wheel angle is not measurable, the failure determination unit 110 is configured to control the curvature prediction unit 120 to generate a predicted curvature based on the yaw rate and to control the position prediction unit 130 to generate a predicted position based on the predicted curvature.

The curvature prediction unit 120 predicts a curvature when the vehicle travels on a curved road. In other words, the curvature prediction unit 120 predicts a traveling route when the vehicle turns.

The curvature prediction unit 120 predicts a curvature at which the vehicle turns using the rear wheel angle, the front wheel angle, a distance between the rear wheel and the front wheel, a center of gravity of the vehicle, or the like.

Hereinafter, a process in which the curvature prediction unit 120 predicts a curvature at which the vehicle turns will be described in more detail with reference to FIG. 2.

According to an exemplary embodiment of the present disclosure, each of the rear wheel steering unit 100, the failure determination unit 110, the curvature prediction unit 120, and the position prediction unit 130 may be implemented by a processor (e.g., computer, microprocessor, CPU, ASIC, circuitry, logic circuits, etc.). Alternatively, the rear wheel steering unit 100, the failure determination unit 110, the curvature prediction unit 120, and the position prediction unit 130 may be integrated in a single processor.

Figure 2:
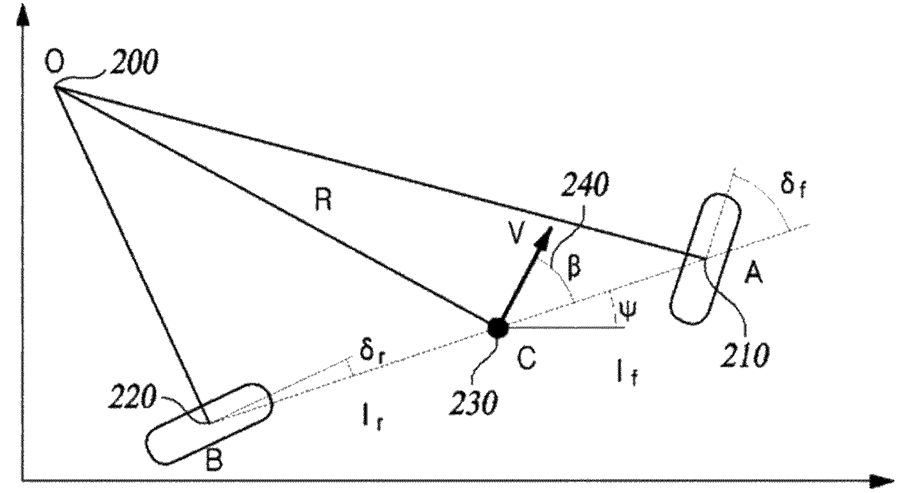
FIG. 2 is a graph showing a method in which a curvature prediction unit predicts a curvature at which a vehicle turns, according to an exemplary embodiment of the present disclosure.

FIG. 2 is a graph showing a method in which the curvature prediction unit 120 predicts the curvature at which the vehicle turns, according to an exemplary embodiment of the present disclosure.

The curvature prediction unit 120 predicts the curvature at which the vehicle turns using an Ackermann geometry model. The curvature prediction unit 120 applies the front wheel angle and the rear wheel angle of the vehicle to the Ackermann geometry model to predict the curvature at which the vehicle turns.

The curvature prediction unit 120 is configured to determine an origin O 200. The origin O is a point at which a straight line perpendicular to a direction in which a front wheel A 210 is directed and a straight line perpendicular to a direction in which a rear wheel B 220 is directed meet. A direction perpendicular to a straight line OC between the origin O and a center of gravity C 230 of the vehicle is a direction of speed at the center of gravity of the vehicle. An angle formed between the direction of speed at the center of gravity and the longitudinal axis of the vehicle is referred to as a side slide angle 240.

In a triangle OCA, when a sine rule is applied, a relationship shown in Equation 1 may be obtained.

$$\frac{\sin(\delta_f - \beta)}{l_f} = \frac{\sin\left(\frac{\pi}{2} - \delta_f\right)}{R} \quad \text{[Equation]}$$

Here $\delta_f$ denotes the front wheel angle, $l_f$ denotes a distance between the center of gravity 230 and a front wheel 210, R denotes a distance between the center of gravity 230 of the vehicle and the origin O 200, and β denotes a side slide angle 240.

When a sine law is applied to a triangle OCB, a relationship shown in Equation 2 may be obtained.

$$\frac{\sin(\beta - \delta_r)}{l_r} = \frac{\sin\left(\frac{\pi}{2} - \delta_r\right)}{R} \quad \text{[Equation]}$$

Here, $\delta_r$ denotes the rear wheel angle, $l_r$ denotes a distance between the center of gravity 230 and a rear wheel 220, and R is a distance between the center of gravity 230 of the vehicle and the origin O 200.

When Equation 1 and Equation 2 are transformed using a trigonometric function, a relationship as shown in Equation 3 may be obtained.

$$\tan(\delta_f)\cos(\beta) - \sin\beta = \frac{l_f}{R} \quad \text{[Equation 3]}$$

$$\sin\beta - \tan(\delta_r)\cos(\beta) = \frac{l_f}{R}$$

When the two equations in Equation 3 is added, Equation 4 is obtained.

$$\{\tan(\delta_f) - \tan(\delta_r)\}\cos(\beta) = \frac{l_f + l_r}{R} \quad \text{[Equation 4]}$$

When the vehicle is traveling at low speed and the radius of curvature R of the vehicle changes slowly, a yaw rate ψ of the vehicle may be assumed to be equal to an angular velocity of the vehicle. When Equation 4 is applied to the angular velocity of the vehicle, the yaw rate of the vehicle is as shown in Equation 5.

$$\psi = \frac{V\cos(\beta)}{l_f + l_r}(\{\tan(\delta_f) - \tan(\delta_r)\}) \quad \text{[Equation 5]}$$

Furthermore, the side slide angle 240 is determined as shown in Equation 6 from Equation 3.

$$\beta = \tan^{-1}\left(\frac{l_f\tan(\delta_r) + l_r\tan(\delta_f)}{l_f + l_r}\right) \quad \text{[Equation 6]}$$

Therefore, a predicted curvature of the vehicle is as shown in Equation 7.

$$\rho = \frac{1}{R} = \frac{(\tan(\delta_f) - \tan(\delta_r))\cos(\beta)}{l_f + l_r} \quad \text{[Equation 7]}$$

When the rear wheel angle is unknown, the curvature prediction unit 120 may be configured to generate the predicted curvature based on the yaw rate of the vehicle. A method by which the curvature prediction unit 120 generates the predicted curvature based on the yaw rate of the vehicle is as shown in Equation 8.

$$\rho = \frac{\gamma}{V_x} \quad \text{[Equation 8]}$$

Here, $\gamma$ denotes the yaw rate. $V_X$ denotes the speed of the vehicle.

Because the method of generating the predicted curvature based on the yaw rate is already a known method, detailed description thereof will be omitted.

The position prediction unit 130 may be configured to generate a predicted position of the vehicle based on an acceleration, speed, and predicted curvature of the vehicle. The position prediction unit 130 is configured to determine the yaw rate of the vehicle using the predicted curvature, acceleration, and speed of the vehicle as shown in Equation 9.

$$\hat{\rho} \cdot \hat{V}_x = \hat{\gamma}, \text{ when } \hat{V}_x = V_x + \alpha \Delta t \quad \text{[Equation 9]}$$

Here, $\hat{\rho}$ denotes the predicted curvature determined by use of Equation 7, and $\hat{\gamma}$ denotes the yaw rate of the vehicle $\alpha$ is the acceleration of the vehicle. $V_X$ denotes the speed of the vehicle.

The position prediction unit 130 utilizes the yaw rate to determine the position of the vehicle over time. A method by which the position prediction unit 130 is configured to determine the position of the vehicle over time is as shown in Equation 10.

$$\begin{bmatrix} X[t+1] \\ Y[t+1] \\ \psi[t+1] \end{bmatrix} = \begin{bmatrix} X[t] + V[t]\sin(\hat{\gamma}[t]) \\ Y[t] + V[t]\cos(\hat{\gamma}[t]) \\ \psi[t] + \dot{\psi}[t]\Delta t \end{bmatrix} \quad \text{[Equation 10]}$$

Here, X[t] denotes an X-direction position of the vehicle at t seconds, and Y[t] denotes a Y-direction position of the vehicle at t seconds. Ψ[t] denotes the yaw angle of the vehicle at t seconds.

The position prediction unit 130 may be configured to determine the position of the vehicle at predetermined time intervals. The position prediction unit 130 can determine the position of the vehicle for a predetermined time. According to an exemplary embodiment of the present disclosure, the position prediction unit 130 may be configured to determine the position of the vehicle at 0.1 second intervals for 4 seconds from a current time. In other words, in the position prediction unit 130, a range of t may be 0 to 4 seconds, and $\Delta t$ may be 0.1 seconds.

Figure 3:
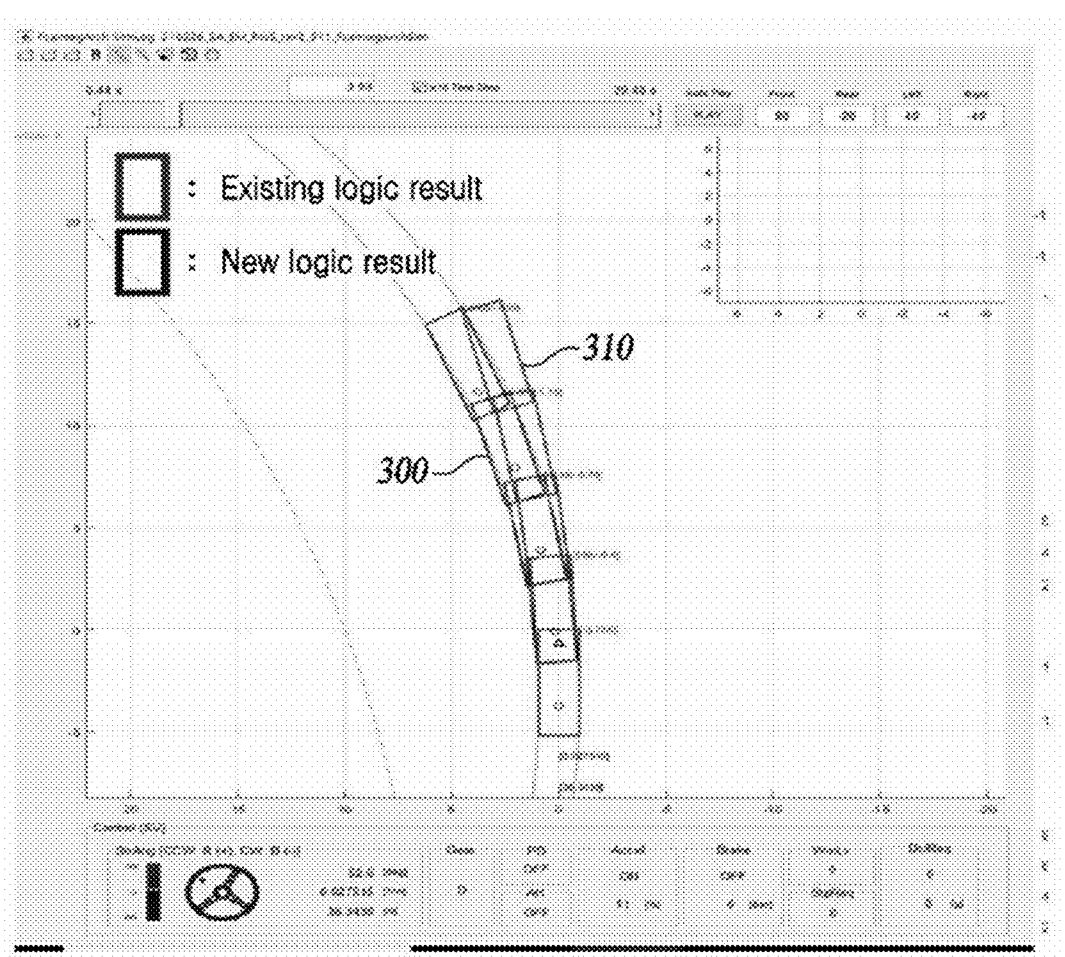
FIG. 3 is a diagram illustrating a predicted position of the vehicle according to an exemplary embodiment of the present disclosure.

FIG. 3 is a diagram illustrating a predicted position of the vehicle according to an exemplary embodiment of the present disclosure.

FIG. 3 illustrates the position of the vehicle predicted by the vehicle control apparatus 10 when the radius of curvature R is 30 m and the speed is 10 to 15 km/h. Referring to FIG. 3, when the vehicle travels along a curved actual road, the predicted position of the vehicle appears. Reference number 300 in FIG. 3 indicates a predicted position generated by reflecting the rear wheel angle. Reference number 310 in FIG. 3 indicates a predicted position generated using only the front wheel angle, without reflecting the rear wheel angle.

When the predicted curvature and predicted position 300 are generated by reflecting the rear wheel angle, the predicted position 300 of the vehicle is determined along the actual road. However, when the predicted curvature and predicted position 310 are generated without taking the rear wheel angle into account, the predicted position 310 of the vehicle deviates from the actual road. In other words, the predicted curvature is lower than an actual traveling curvature.

Because the radius of curvature of the vehicle is reduced due to rear wheel steering, that is, the traveling curvature increases, the predicted curvature is lower than the traveling curvature when the rear wheel angle is not taken into account. That is, the position prediction unit 130 generates the predicted position based on the predicted curvature reflecting the rear wheel angle, generating a more accurate predicted position than the predicted position generated based on the predicted curvature generated by reflecting only the front wheel angle.

The rear wheel steering unit 100 can control the rear wheels of the vehicle using the predicted curvature generated by the curvature prediction unit 120 and the predicted position generated by the position prediction unit 130.

When the rear wheel steering unit 100 fails, a collision avoidance function of an autonomous vehicle generally ends. However, the vehicle control apparatus 10 according to an exemplary embodiment of the present disclosure can maintain the collision avoidance function by generating the predicted position of the vehicle even when the rear wheel steering unit 100 fails.

Figure 4:
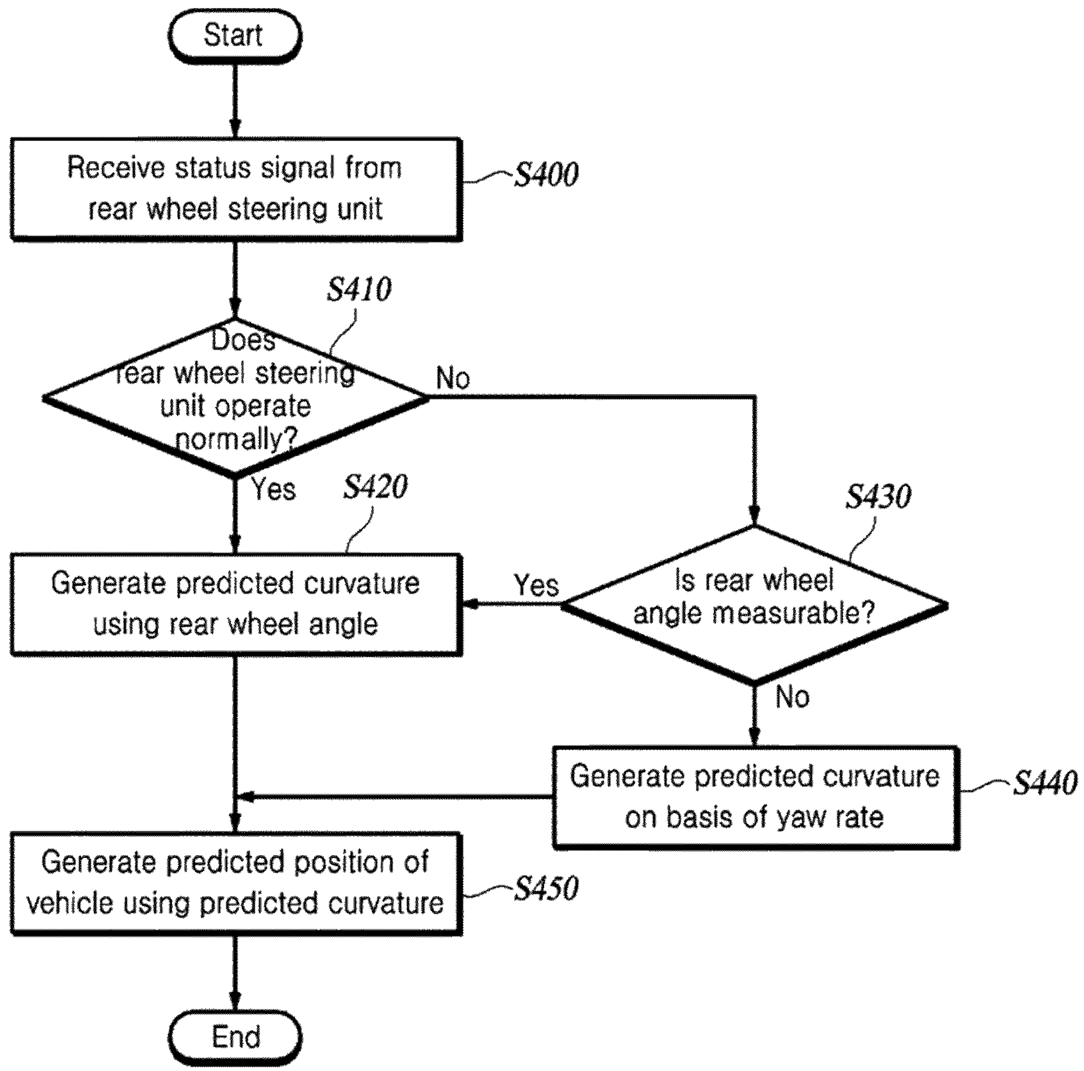
FIG. 4 is a flowchart illustrating a method of controlling a vehicle according to an exemplary embodiment of the present disclosure.

FIG. 4 is a flowchart illustrating a method of controlling a vehicle according to an exemplary embodiment of the present disclosure.

Referring to FIG. 4, the rear wheel steering unit 100 generates the status signal. The failure determination unit 110 receives the status signal from the rear wheel steering unit 100 (S400). The failure determination unit 110 is configured to determine a failure state of the rear wheel steering unit 100 based on the status signal.

The failure determination unit 110 is configured to determine whether or not the rear wheel steering unit 100 operates normally (S410). Here, when there is no failure in the rear wheel steering unit 100, the failure determination unit 110 may be configured to determine that the rear wheel steering unit 100 operates normally.

When the rear wheel steering unit 100 operates normally, the curvature prediction unit 120 generates the predicted curvature based on the rear wheel angle, the front wheel angle, and the yaw rate (S420).

When the rear wheel steering unit 100 does not operate normally, the failure determination unit 110 is configured to determine whether the rear wheel angle is measurable (S430). When the rear wheel angle is measurable, the curvature prediction unit 120 generates the predicted curvature of the vehicle based on, for example, the rear wheel angle and the front wheel angle.

When the rear wheel angle is not measurable, the curvature prediction unit 120 generates the predicted curvature of the vehicle based on the yaw rate (S440).

The position prediction unit 130 generates the predicted position of the vehicle based on the predicted curvature generated by the curvature prediction unit 120 (S450). The position prediction unit 130 may be configured to generate the predicted position of the vehicle using a predetermined time interval. For example, the position prediction unit 130 can predict the position of the vehicle at 0.1 second intervals. That is, the position of the vehicle at 0.0 seconds, the position of the vehicle at 0.1 seconds, and the position of the vehicle at 0.2 seconds, for example, may be predicted.

According to an exemplary embodiment of the present disclosure, there is an effect that it is possible to generate a predicted curvature and predicted position of a vehicle close to an actual behavior based on the rear wheel angle when the vehicle turns.

Furthermore, according to an exemplary embodiment of the present disclosure, there is an effect that it is possible to use a frontal collision avoidance function even when the rear wheel angle is not measurable, by generating the predicted curvature and predicted position of a vehicle based on whether or not the rear wheel angle is measurable.

The effects to be obtained by the present disclosure are not limited to the effects mentioned above, and other effects not mentioned will be clearly understood by those skilled in the art from the description below.

Each element of the apparatus or method in accordance with various aspects of the present disclosure may be implemented in hardware or software, or a combination of hardware and software. The functions of the respective elements may be implemented in software, and a microprocessor may be implemented to execute the software functions corresponding to the respective elements.

Various embodiments of systems and techniques described herein may be realized with digital electronic circuits, integrated circuits, field programmable gate arrays (FPGAs), application specific integrated circuits (ASICs), computer hardware, firmware, software, and/or combinations thereof. The various embodiments may include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a compact disc ROM (CD-ROM), magnetic tape, a floppy disk, a memory card, a hard disk, or an optical data storage device. Furthermore, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in the present specification as being sequentially performed, this is merely an exemplary description of the technical idea of an exemplary embodiment of the present disclosure. In other words, those skilled in the art to which an exemplary embodiment of the present disclosure belongs may appreciate that various modifications and changes may be made without departing from essential features of an exemplary embodiment of the present disclosure, that is, the sequence illustrated in the flowcharts/timing charts may be changed and one or more operations of the operations may be performed in parallel. Thus, flowcharts/timing charts are not limited to the temporal order.

The control device may be at least one microprocessor operated by a predetermined program which may include a series of commands for carrying out the method included in the aforementioned various exemplary embodiments of the present disclosure.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle control apparatus, comprising:

a rear-wheel steering unit configured to steer rear wheels of a vehicle, to measure a rear wheel angle, and to generate a status signal;

a failure determination unit operatively connected to the rear-wheel steering unit and configured to determine a failure situation of the rear-wheel steering unit based on the status signal;

a curvature prediction unit operatively connected to the failure determination unit and configured to generate a predicted curvature of a traveling route of the vehicle; and a position prediction unit operatively connected to the curvature prediction unit and configured to generate a predicted position of the vehicle based on the predicted curvature, wherein the failure determination unit is configured to control the curvature prediction unit to generate the predicted curvature based on the rear wheel angle and a front wheel angle and to control the position prediction unit to generate the predicted position of the vehicle based on the predicted curvature when the rear wheel steering unit operates normally, wherein the failure determination unit is configured to control the curvature prediction unit to generate the predicted curvature based on the rear wheel angle and the front wheel angle and to control the position prediction unit to generate the predicted position of the vehicle based on the predicted curvature when the rear wheel steering unit does not operate normally and the rear wheel angle is measurable, and wherein the failure determination unit is configured to control the curvature prediction unit to generate the predicted curvature based on a yaw rate and to control the position prediction unit to generate the predicted position of the vehicle based on the predicted curvature when the rear wheel steering unit does not operate normally and the rear wheel angle is not measurable.

2. The vehicle control apparatus of claim 1, wherein the position prediction unit is further configured to generate the predicted position by an equation:

$$\begin{bmatrix} X[t+1] \\ Y[t+1] \\ \psi[t+1] \end{bmatrix} = \begin{bmatrix} X[t] + V[t]\sin(\hat{\gamma}[t]) \\ Y[t] + V[t]\cos(\hat{\gamma}[t]) \\ \psi[t] + \psi[t]\Delta t \end{bmatrix}$$

wherein $\hat{\gamma}[t]$ is a yaw rate at time t, X[t] denotes an X-direction position of the vehicle at t seconds, and Y[t] denotes a Y-direction position of the vehicle at t seconds, $\psi[t]$ denotes a yaw angle of the vehicle at t seconds.

3. The vehicle control apparatus of claim 2, wherein the yaw rate $\hat{\gamma}[t]$ is determined by an equation:

$$\hat{\rho} \cdot \hat{V}_x = \hat{\gamma}$$

wherein $\hat{\rho}$ is the predicted curvature, wherein $\hat{V}_x = V_x + \alpha\Delta t$, wherein $V_X$ is a speed of the vehicle, wherein $\alpha$ is an acceleration of the vehicle, and wherein $\Delta t$ is a predetermined time interval.

4. The vehicle control apparatus of claim 1, wherein the position prediction unit is further configured to generate a plurality of predicted positions, each of the plurality of predicted positions being a predicted position generated at a predetermined time interval.

5. The vehicle control apparatus of claim 1, wherein the rear wheel steering unit controls the rear wheels of the vehicle using the predicted curvature generated by the curvature prediction unit and the predicted position generated by the position prediction unit.

6. A method performed by a vehicle control apparatus for generating a predicted position of a vehicle in response that the vehicle turns, the method comprising:

measuring, by a processor including a rear-wheel steering unit, a rear wheel angle;

generating, by the processor, a status signal of the rear-wheel steering unit;

determining, by the processor, a failure situation of the rear-wheel steering unit based on the status signal;

generating, by the processor, a predicted curvature; and generating, by the processor, the predicted position of the vehicle based on the predicted curvature, controlling, by the processor, a rear wheel of the vehicle using the predicted curvature and the predicted position, wherein the generating of the predicted curvature includes generating the predicted curvature based on the rear wheel angle and a front wheel angle when the rear wheel steering unit operates normally, wherein the generating of the predicted curvature includes generating the predicted curvature based on the rear wheel angle and the front wheel angle when the rear wheel steering unit does not operate normally and the rear wheel angle is measurable, and wherein the generating of the predicted curvature includes generating the predicted curvature based on a yaw rate when the rear wheel steering unit does not operate normally and the rear wheel angle is not measurable.

7. The method of claim 6, wherein generating the predicted position includes:

generating the predicted position by an equation:

$$\begin{bmatrix} X[t+1] \\ Y[t+1] \\ \psi[t+1] \end{bmatrix} = \begin{bmatrix} X[t] + V[t]\sin(\hat{\gamma}[t]) \\ Y[t] + V[t]\cos(\hat{\gamma}[t]) \\ \psi[t] + \psi[t]\Delta t \end{bmatrix}$$

wherein $\hat{\gamma}[t]$ is a yaw rate at time t, X[t] denotes an X-direction position of the vehicle at t seconds, and $Y[t]$ denotes a Y-direction position of the vehicle at t seconds, $\psi[t]$ denotes a yaw angle of the vehicle at t seconds.

8. The method of claim 7, wherein the yaw rate $\hat{\gamma}[t]$ is determined by an equation:

$$\hat{\rho} \cdot \hat{V}_x = \hat{\gamma}$$

wherein $\hat{\rho}$ is the predicted curvature, wherein $\hat{V}_x = V_x + \alpha\Delta t$, wherein $V_X$ is a speed of the vehicle wherein $\alpha$ is an acceleration of the vehicle, and wherein $\Delta t$ is a predetermined time interval.

9. The method of claim 6, wherein generating the predicted position includes: generating a plurality of predicted positions, and wherein each of the plurality of predicted positions is a predicted position generated at a predetermined time interval.

10. The method of claim 6, further including:

controlling rear wheels of the vehicle using the predicted curvature and the predicted position.

11. A non-transitory computer-readable recording medium having recorded thereon a program including instructions executed by at least one processor, the instructions executed by the at least one processor including a rear-wheel steering unit, causing the at least one processor to:

measuring a rear wheel angle;

generating a status signal of the rear-wheel steering unit;

determining a failure situation of the rear-wheel steering unit based on the status signal;

generating a predicted curvature;

generating a predicted position of the vehicle based on the predicted curvature; and controlling a rear wheel of a vehicle using the predicted curvature and the predicted position of the vehicle, wherein the generating of the predicted curvature includes generating the predicted curvature based on the rear wheel angle, wherein the generating of the predicted curvature includes generating the predicted curvature based on the rear wheel angle and a front wheel angle when the rear wheel steering unit operates normally, wherein the generating of the predicted curvature includes generating the predicted curvature based on the rear wheel angle and the front wheel angle when the rear wheel steering unit does not operate normally and the rear wheel angle is measurable, and wherein the generating of the predicted curvature includes generating the predicted curvature based on a yaw rate when the rear wheel steering unit does not operate normally and the rear wheel angle is not measurable.

* * * * *